(12) United States Patent
Kawachiya et al.

(10) Patent No.: US 7,519,966 B2
(45) Date of Patent: Apr. 14, 2009

(54) INFORMATION PROCESSING AND CONTROL

(75) Inventors: Kiyokuni Kawachiya, Yokohama (JP); Takeshi Ogasawara, Hachioji (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 11/268,444

(22) Filed: Nov. 7, 2005

(65) Prior Publication Data

US 2006/0101466 A1  May 11, 2006

(30) Foreign Application Priority Data

Nov. 8, 2004 (JP) ............................. 2004-324004

(51) Int. Cl.
*G06F 9/46* (2006.01)
(52) U.S. Cl. ....................... 718/100; 718/101; 718/102; 718/107
(58) Field of Classification Search ................. 718/100, 718/101, 102, 107
See application file for complete search history.

(56) References Cited

U.S. PATENT DOCUMENTS

| 7,096,470 | B2 * | 8/2006 | Brown et al. | 718/102 |
| 2005/0086028 | A1 * | 4/2005 | Jones et al. | 702/187 |

* cited by examiner

*Primary Examiner*—Thomas Lee
*Assistant Examiner*—Jaweed A Abbaszadeh
(74) *Attorney, Agent, or Firm*—Louis Paul Herzberg; Shimokaji & Associates, P.C.

(57) ABSTRACT

Information processing apparatus, including occurrence number counter counting events that occurred in each of a plurality of CPUs. Apparatus performs functions of; storing accumulated occurrence number of events, which occurred while the thread is being executed by each of the CPUs, in a thread storage area of the thread associating accumulated occurrence number with CPU; storing, in the thread storage area, a value of occurrence number counter of the CPU, the value having been counted before the thread is resumed by the CPU; and adding, to accumulated occurrence number which has been stored in accumulated number storing unit while corresponding to the CPU, a difference value obtained by subtracting a counter value, which has been stored in the start-time number storing unit of the thread, from a counter value of the occurrence number counter of the CPU, in a case where the CPU terminates an execution of the thread.

1 Claim, 7 Drawing Sheets

INFORMATION PROCESSING AND CONTROL

FIELD OF THE INVENTION

The present invention relates to an information processing apparatus, a program product, and a control method. The present invention relates particularly to information processing and control, for storing the number of events, which have occurred while the program is being executed, for each thread.

BACKGROUND OF THE INVENTION

The simplest method for knowing an amount of usage of a resource for each thread is to use a system call of an OS kernel. For example, an amount of usage of a central processing unit (CPU) can be known by means of getrusage( ) in Linux and GetThreadTimes( ) in Windows (registered trademark). However, the system call requires a transition to a privileged mode, and accordingly costs much. Therefore, the system call is not suitable for such a way of use as storing time stamps at entrances and exits of all methods. Moreover, besides such a problem of the cost, there is also a risk that excessive processing such as a rescheduling is performed in the OS kernel owing to the system call, leading to a disturbance of an inherent behavior of an application.

In many cases, a recent CPU includes a "resource usage counter" readable from a user level. For example, in a CPU such as Pentium (registered trademark), a 64-bit internal counter termed as "time stamp counter (TSC)" holding the number of clock counts from the time of reset is prepared, and is readable by means of the RDTSC instruction. However, this counter is accompanied with the CPU, and is counted up no matter which thread is being executed. Accordingly, from the counter, the amount of usage of resource for each thread cannot be known.

By contrast, a package for the Linux, which is termed as "Estime," has provided a solution to this problem (as disclosed by Estime: a *High-Resolution Virtual Timer for Linux*, Homepage URL<http://estime.sourceforge.net/>). According to this method, when an OS kernel is going to dispatch a thread, an amount of the CPU capacity, which has been used by the thread by then, and a value of the TSC at the time the dispatch is performed are written into a memory area which has been mapped in a user space. The thread can calculate an amount of the CPU capacity, which has been used at an arbitrary time, from these values and the most recent value of the TSC, without entering into the OS kernel. This method is innovative in that a low-cost measurement of an amount of resource used can be performed "for each of the threads." However, no attention has been paid to a measurement "for each of the CPUs."

When a large-scale program such as a Web application is investigated by a sampling measurement, in many cases, there is no specific method executed extremely frequently, and a flat profile where the respective methods are evenly executed is obtained. Therefore, it is difficult to use a conventional technique of tuning a "hot method".

In order to grasp and improve a behavior of such an application, it is necessary to make investigations considering an execution path of the method, and to find a critical path which consumes the resource. However, when it costs much to measure the amount of usage of the resource, there occur such problems that an overhead of the measurement itself becomes dominant, and that the behavior of the application is changed. Moreover, the measurement considering the execution path does not make sense if the measurement cannot be performed for each thread. If such information on the amount of usage of the resource can be measured for each CPU, it is made possible to know a status where it takes time to execute a code or a cache miss frequently occurring in a specific CPU.

SUMMARY OF THE INVENTION

In this connection, it is an aspect of the present invention to provide an information processing apparatus, a program product, and a control method, which are capable of solving the above-described problems. This aspect is attained by a combination of features described in independent claims in the scope of claims. Moreover, dependent claims define more advantageous specific examples of the present invention.

In order to solve the above-described problems, a first aspect of the present invention provides an information processing apparatus for storing the number of events, which have occurred in each of central processing units which is executing a thread, into a thread storage area accessible by the thread thus executed in a user mode, comprising: an occurrence number counter, which is provided correspondingly to each of the plurality of central processing units, and which counts the number of events having occurred in the central processing unit; an accumulated number storing unit, which is provided in a thread storage area correspondingly to each thread, and which stores an accumulated occurrence number of events having occurred while the thread was being executed by the central processing unit, the accumulated occurrence number having been counted until the central processing unit terminated an execution of the thread at the last time, while associating the accumulated occurrence number with each of the central processing units; a start-time number storing unit, which is provided in the thread storage area correspondingly to each thread, and which stores a counter value of the occurrence number counter of the central processing unit, the counter value having been counted until the thread is resumed by the central processing unit which has been executing the thread; and an accumulated number updating unit for adding, to the accumulated occurrence number which has been stored in the accumulated number storing unit corresponding to the central processing unit, a difference value obtained by subtracting a counter value, which has been stored in the start-time number storing unit of the thread, from a counter value of the occurrence number counter of the central processing unit, in response to the central processing unit's termination of the execution of the thread. Moreover, the aspect of the present invention provides a control method for controlling the information processing apparatus, and a program product for operating the information processing apparatus.

Note that the above-described summary of the invention does not list all features necessary for the present invention, and subcombinations of groups of these features can also constitute the invention.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

The present invention provides an information processing apparatus, a program product, and a control method, capable of solving the above-described problems. In an example embodiment, the present invention provides an information processing apparatus for storing the number of events, which have occurred in each of central processing units which is executing a thread, into a thread storage area accessible by the thread thus executed in a user mode. The apparatus includes: an occurrence number counter, which is provided correspondingly to each of the plurality of central processing units, and which counts the number of events having occurred in the central processing unit; an accumulated number storing unit, which is provided in a thread storage area correspondingly to each thread, and which stores an accumulated occurrence number of events having occurred while the thread was being executed by the central processing unit, the accumulated occurrence number having been counted until the central processing unit terminated an execution of the thread at the last time, while associating the accumulated occurrence number with each of the central processing units; a start-time number storing unit, which is provided in the thread storage area correspondingly to each thread, and which stores a counter value of the occurrence number counter of the central processing unit, the counter value having been counted until the thread is resumed by the central processing unit which has been executing the thread; and an accumulated number updating unit for adding, to the accumulated occurrence number which has been stored in the accumulated number storing unit corresponding to the central processing unit, a difference value obtained by subtracting a counter value, which has been stored in the start-time number storing unit of the thread, from a counter value of the occurrence number counter of the central processing unit, in response to the central processing unit's termination of the execution of the thread. Moreover, the aspect of the present invention provides a control method for controlling the information processing apparatus, and a program product for operating the information processing apparatus.

It is noted that sub-combinations of groups of these features can also constitute the invention. The present invention will be described below with reference to more particular embodiments thereof. However, the embodiments below do not limit the invention set forth in the scope of claims, and not all combinations of features described in the embodiment are essential to the solution means of the invention.

Figure 1:
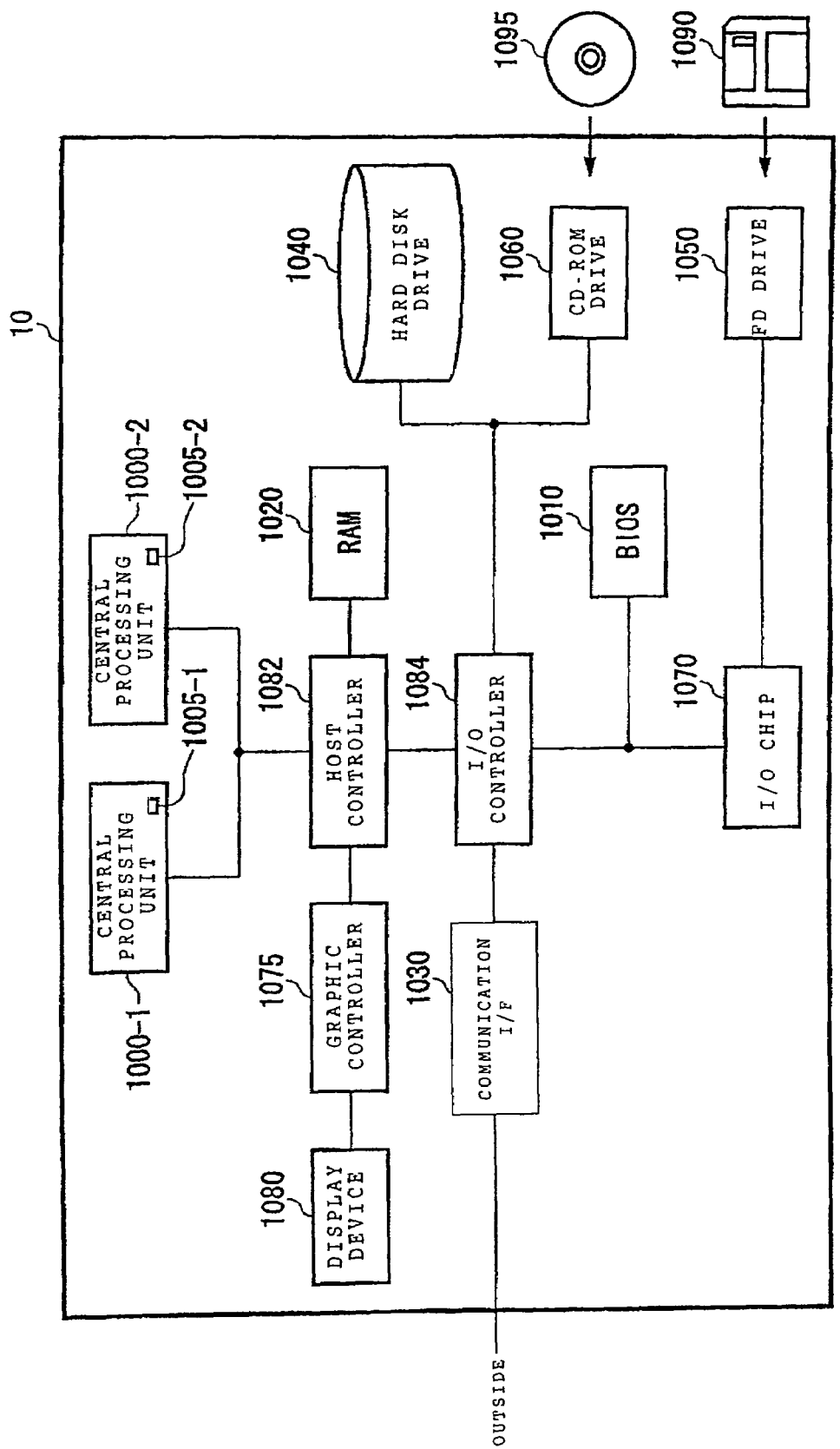
FIG. 1 shows an entire configuration of an information processing apparatus 10.

FIG. 1 shows an entire configuration of an information processing apparatus 10. The information processing apparatus 10 includes a CPU and its peripheral unit having a central processing unit 1000-1, a central processing unit 1000-2, a RAM 1020, and a graphic controller 1075, which are interconnected by a host controller 1082. Moreover, the information processing apparatus 10 includes an input/output unit having a communication interface 1030, a hard disk drive 1040, and a CD-ROM drive 1060, which are connected to the host controller 1082 by an input/output controller 1084.

Furthermore, the information processing apparatus 10 includes a legacy input/output unit having a ROM 1010, a flexible disk drive 1050, and an input/output chip 1070, which are connected to the input/output controller 1084. The host controller 1082 interconnects the RAM 1020, the central processing units 1000-1 and 1000-2 accessing the RAM 1020 at a high transfer rate, and the graphic controller 1075.

Each of the central processing unit 1000-1 and the central processing unit 1000-2 operates based on programs stored in the ROM 1010 and the RAM 1020, and controls the respective units. Moreover, the central processing unit 1000-1 includes an occurrence number counter 1005-1 which is provided correspondingly to the central processing unit 1000-1 and counts the number of events having occurred in the central processing unit 1000-1. Likewise, the central processing unit 1000-2 includes an occurrence number counter 1005-2 which is provided correspondingly to the central processing unit 1000-2 and counts the number of events having occurred in the central processing unit 1000-2. The occurrence number counter 1005-1 and the occurrence number counter 1005-2 are readable by a program operating in a user mode.

Here, an event occurring in the central processing unit 1000-1 is, for example, a progress of an execution cycle processed by the central processing unit 1000-1. Specifically, for example, in the case where the central processing unit 1000-1 is a Pentium (registered trademark) or the like, the occurrence number counter 1005-1 is a time stamp counter (TSC). In place of this, the occurrence number counter 1005-1 may count the occurrence number of branch prediction misses caused by accesses from the central processing unit 1000-1, may count the number of instructions executed by the central processing unit 1000-1, or may count the occurrence number of cache misses which have occurred in the central processing unit 1000-1.

The RAM 1020 stores various data to be read out by the central processing unit 1000-1 or the central processing unit 1000-2. The graphic controller 1075 acquires image data created on a frame buffer provided in the RAM 1020 by the central processing unit 1000-1 or the like, and displays an image on a display device 1080 based on the image data. In place of this, the graphic controller 1075 may include, in the inside thereof, a frame buffer which stores image data created by the central processing unit 1000-1 or the like.

The input/output controller 1084 interconnects the host controller 1082, and the communication interface 1030, the hard disk drive 1040, and the CD-ROM drive 1060, which are relatively high-speed input/output devices. The communication interface 1030 communicates with an external apparatus through a network. The hard disk drive 1040 stores programs and data for use in the information processing apparatus 10. The CD-ROM drive 1060 reads programs or data from a CD-ROM 1095, and provides the programs or the data trough the input/output chip 1070 to the RAM 1020.

Moreover, relatively low-speed input/output devices such as the ROM 1010, the flexible disk drive 1050 and the input/output chip 1070 are connected to the input/output controller 1084. The ROM 1010 stores a boot program executed by the central processing unit 1000-1 or the central processing unit 1000-2 when the information processing apparatus 10 is activated, a program depending on hardware of the information processing apparatus 10, and the like. The flexible disk drive 1050 reads programs or data from a flexible disk 1090, and provides the programs or the data through the input/output chip 1070 to the RAM 1020. The input/output chip 1070 connects the flexible disk 1090 and various input/output devices through, for example, a parallel port, a serial port, a keyboard port, a mouse port and the like.

Each of the programs provided to the information processing apparatus 10 is stored in a storage medium such as the flexible disk 1090, the CD-ROM 1095 and an IC card, and is provided by a user. The program is read out from the storage medium through the input/output chip 1070 and/or the input/output controller 1084, installed on the information processing apparatus 10, and executed therein. Operations which the program causes the information processing apparatus 10 to perform will be described later with reference to FIGS. 2 to 7.

The programs described above may be stored in an external storage medium. An optical storage medium such as a DVD and a PD, a magneto-optical storage medium such as an MD, a tape medium, a semiconductor memory such as an IC card, and the like, can be used as such a storage medium besides the flexible disk 1090 and the CD-ROM 1095. Moreover, a storage device such as a hard disk and a RAM which are provided in a server system connected to a private communication network and the Internet may be used as the storage medium, and the programs may be provided to the information processing apparatus 10 through such a network.

Figure 2:
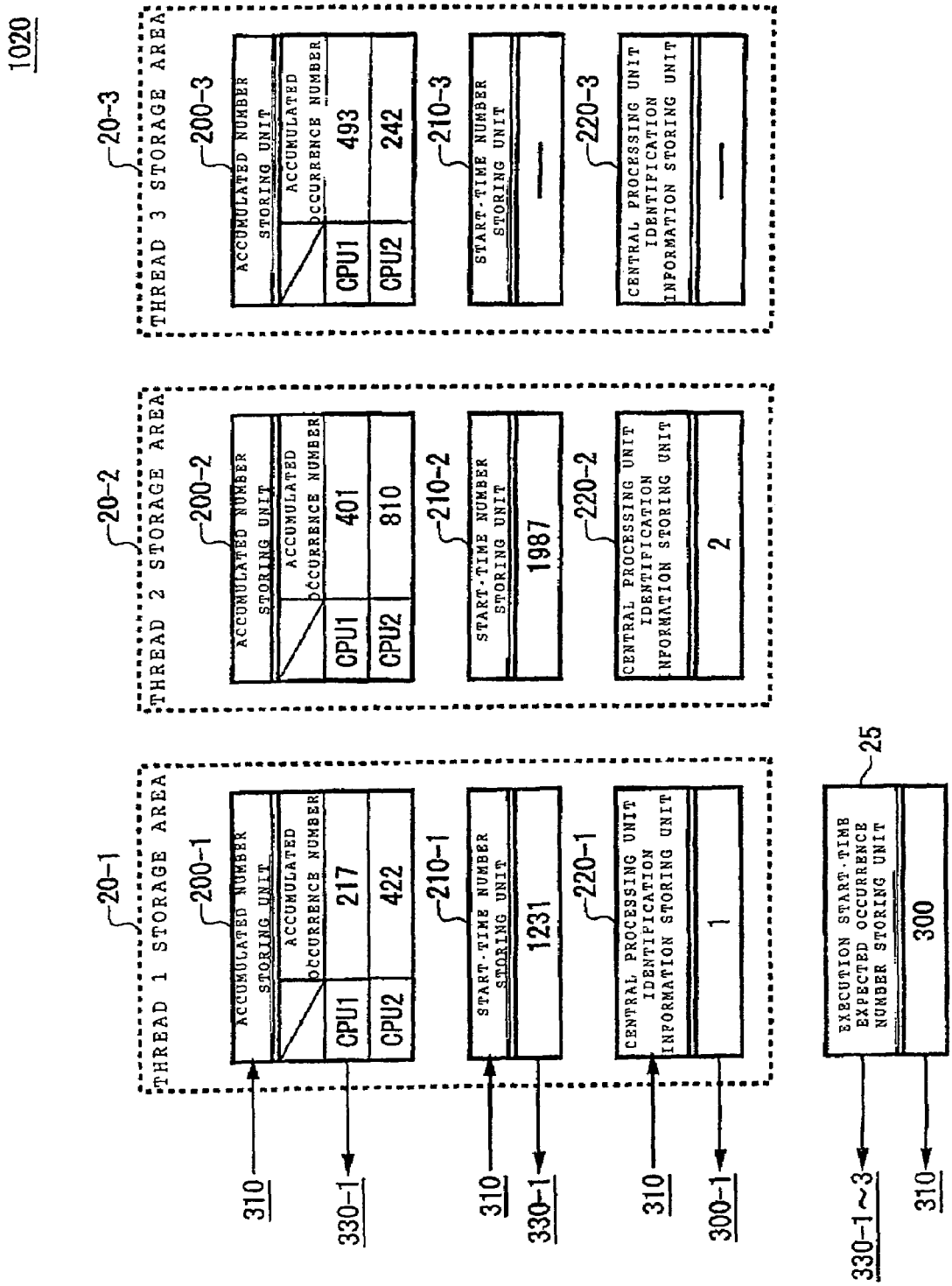
FIG. 2 shows an example of a structure of data stored in thread storage areas of a RAM 1020.

FIG. 2 shows an example of a structure of data stored in thread storage areas of the RAM 1020. The RAM 1020 includes a thread storage area 20-1, a thread storage area 20-2, and a thread storage area 20-3. The thread storage area 20-1 is an area provided correspondingly to a thread 1, and accessible in a user mode by the thread 1. The thread storage area 20-2 is an area provided correspondingly to a thread 2, and accessible in a user mode by the thread 2. The thread storage area 20-3 is an area provided correspondingly to a thread 3, and accessible in a user mode by the thread 3.

In the thread storage area 20-1, an accumulated number storing unit 200-1, a start-time number storing unit 210-1, and a central processing unit identification information storing unit 220-1 are provided. The accumulated number storing unit 200-1 is provided in the thread storage area 20-1 correspondingly to the thread 1, and stores the accumulated occurrence number of events having occurred while the thread 1 was being executed by each of the central processing units in association with the central processing unit concerned. This accumulated occurrence number is a value updated by an accumulated number updating unit 310, which is to be described later, at the last time when the central processing unit terminated an execution of the thread concerned.

For example, the accumulated number storing unit 200-1 stores the accumulated number of execution cycles processed by the central processing unit 1000-1 while the thread 1 was being executed by the same central processing unit. In place of this, or in addition to this, the accumulated number storing unit 200-1 may store the accumulated occurrence number of branch prediction misses or cache misses which have occurred while the thread 1 was being executed by the central processing unit 1000-1, or store the accumulated number of instruction executions executed by the same central processing unit.

The start-time number storing unit 210-1 is provided in the thread storage area 20-1 correspondingly to the thread 1, and stores a counter value of the occurrence number counter of the central processing unit concerned, which has been counted until the central processing unit executing the thread 1 resumes the thread 1. The central processing unit identification information storing unit 220-1 is provided in the thread storage area 20-1 correspondingly to the thread 1, and stores central processing unit identification information for identifying the central processing unit executing the thread 1.

In the thread storage area 20-2, an accumulated number storing unit 200-2, a start-time number storing unit 210-2, and a central processing unit identification information storing unit 220-2 are provided. The accumulated number storing unit 200-2, the start-time number storing unit 210-2, and the central processing unit identification information storing unit 220-2 are substantially the same as the accumulated number storing unit 200-1, the start-time number storing unit 210-1, and the central processing unit identification information storing unit 220-1, respectively, except that these are associated with the thread 2 in place of the thread 1. Accordingly, description of these will be omitted.

Moreover, in the thread storage area 20-3, an accumulated number storing unit 200-3, a start-time number storing unit 210-3, and a central processing unit identification information storing unit 220-3 are provided. The accumulated number storing unit 200-3, the start-time number storing unit 210-3, and the central processing unit identification information storing unit 220-3 are substantially the same as the accumulated number storing unit 200-1, the start-time number storing unit 210-1, and the central processing unit identification information storing unit 220-1, respectively, except that these are associated with the thread 3 in place of the thread 1. Accordingly, description of these will be omitted.

Furthermore, preferably, the RAM 1020 includes an execution start-time expected occurrence number storing unit 25. The execution start-time expected occurrence number storing unit 25 stores a predetermined expected occurrence number of events expected to occur during a period from a termination of the execution of the thread by the central processing unit to a start of an execution of another thread by the same central processing unit. The expected occurrence number can be regarded as substantially the same regardless of the threads, and accordingly, the execution start-time expected occurrence number storing unit 25 stores an expected occurrence number common to the respective threads.

Moreover, at least a part of the accumulated number storing units 200-1 to 200-3, the start-time number storing units 210-1 to 210-3, the central processing unit identification information storing units 220-1 to 220-3, and the execution start-time expected occurrence number storing unit 25 may be provided not in the RAM 1020 but in a register of the central processing unit 1000-1 or the central processing unit 1000-2. In this case, an access speed of the data can be further enhanced.

Figure 3:
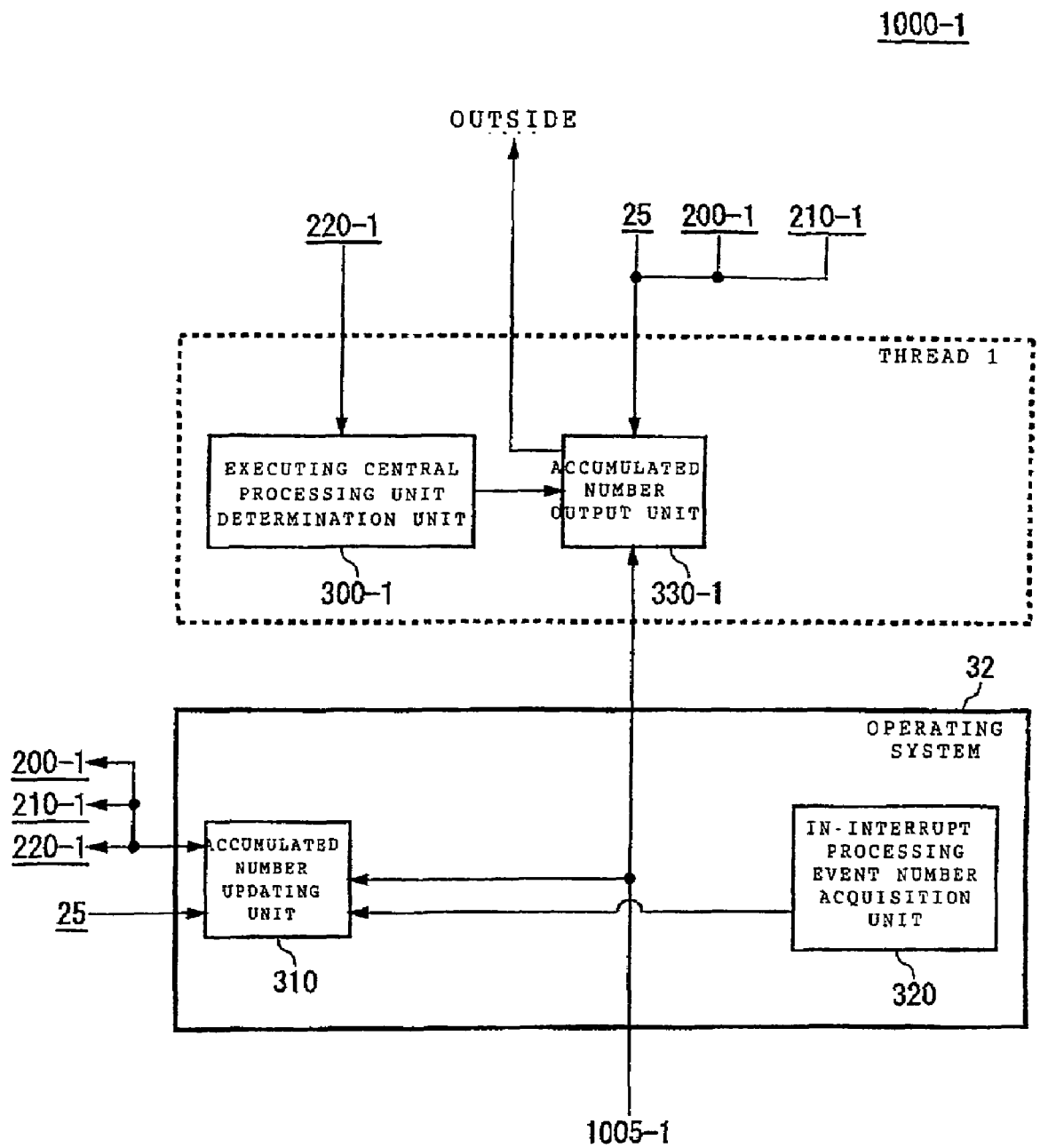
FIG. 3 shows functions of programs executed by a central processing unit 1000-1 while dividing the functions into functional blocks.

FIG. 3 shows functions of the programs executed by the central processing unit 1000-1 while dividing the functions into functional blocks. The central processing unit 1000-1 executes an operating system 32, and executes the thread 1. The operating system 32 includes an accumulated number updating unit 310, and an in-interrupt-processing event number acquisition unit 320. When the central processing unit 1000-1 resumes the execution of the thread 1, the accumulated number updating unit 310 acquires a counter value of the occurrence number counter 1005-1 at the start time, and stores the counter value in the start-time number storing unit 210-1. Moreover, the accumulated number updating unit 310 stores information for identifying the central processing unit 1000-1 executing the thread 1 in the central processing unit identification information storing unit 220-1.

Then, in the case where the central processing unit 1000-1 terminates the execution of the thread 1, the accumulated number updating unit 310 calculates a difference value obtained by subtracting the counter value stored in the start-time number storing unit 210-1 from a counter value of the occurrence number counter 1005-1 at the termination time. Then, the accumulated number updating unit 310 adds the calculated difference value to the accumulated occurrence number stored in the accumulated number storing unit 200-1 in association with the central processing unit 1000-1.

More specifically, in the case where the occurrence number counter 1005-1 is the time stamp counter, the accumulated number updating unit 310 adds the difference value concerned to the accumulated number of execution cycles, which has been stored in the accumulated number storing unit 200-1 in association with the central processing unit 1000-1. Moreover, in the case where the occurrence number counter 1005-1 is a counter for the number of branch prediction misses, the accumulated number updating unit 310 adds the difference value concerned to the accumulated occurrence number of branch prediction misses, which has been stored in the accumulated number storing unit 200-1 in association with the central processing unit 1000-1.

Moreover, in the case where the occurrence number counter 1005-1 is a counter for the number of instructions, the accumulated number updating unit 310 adds the difference value concerned to the accumulated number of instructions, which has been stored in the accumulated number storing unit 200-1 in association with the central processing unit 1000-1. Furthermore, in the case where the occurrence number counter 1005-1 is a counter for the number of cache misses, the accumulated number updating unit 310 adds the difference value concerned to the accumulated occurrence number of cache misses, which has been stored in the accumulated number storing unit 200-1 in association with the central processing unit 1000-1.

Moreover, preferably, the accumulated number updating unit 310 acquires, from the execution start-time expected occurrence number storing unit 25, a predetermined expected occurrence number of events expected to occur during a period from a termination of an execution of a user program by the central processing unit to a start of an execution of another user program by the same central processing unit. Then, the accumulated number updating unit 310 further subtracts the acquired expected occurrence number from the accumulated occurrence number to which the calculated difference value was added. In such a way, the occurrence number of events having occurred while the execution of the thread was being processed to be initialized can be excluded, and the number of events having occurred only while the user program was being executed can be calculated.

Moreover, further preferably, the in-interrupt-processing event number acquisition unit 320 acquires the occurrence number of events having occurred while predetermined interrupt processing for the thread 1 was being processed. Then, in this case, the accumulated number updating unit 310 further subtracts the occurrence number acquired by the in-interrupt-processing event number acquisition unit 320 from the above-described accumulated occurrence number to which the difference value was added. Here, the interrupt processing includes processing involved in an interrupt to the central processing unit from the outside, page fault processing, a standby for I/O completion, and the like. In such a way, the occurrence number of events while the interrupt was occurring can be excluded, and the number of events having occurred only while the user program was being executed can be summed.

The thread 1 not only executes the user program but also functions as an executing central processing unit determination unit 300-1 and an accumulated number output unit 330-1, which are provided correspondingly to the thread 1. The executing central processing unit determination unit 300-1 determines the central processing unit executing the thread 1 in the case where the thread 1 is being executed by either of the central processing units. For example, the executing central processing unit determination unit 300-1 determines a central processing unit identified by the identification information read out from the central processing unit identification information storing unit 220-1 as the central processing unit executing the thread 1.

The accumulated number output unit 330-1 calculates a difference value obtained by subtracting the counter value stored in the start-time number storing unit 210-1 from the counter value of the occurrence number counter 1005-1 of the central processing unit 1000-1 executing the thread 1. Then, the accumulated number output unit 330-1 adds the calculated difference value to the accumulated occurrence number stored in the accumulated number storing unit 200-1 in association with the central processing unit 1000-1, and outputs a value obtained by the above-described addition to the outside.

Moreover, preferably, the accumulated number output unit 330-1 acquires, from the execution start-time expected occurrence number storing unit 25, the predetermined expected occurrence number of events expected to occur during the period from the termination of the execution of the user program by the central processing unit to the start of the execution of another user program by the same central processing unit. Then, the accumulated number output unit 330-1 outputs a value obtained by further subtracting the acquired expected occurrence number from the above-described accumulated occurrence number to which the difference value was added. In such a way, the occurrence number of events having occurred while the execution of the thread was being processed to be initialized can be excluded, and the number of events having occurred only while the user program was being executed can be calculated.

Note that a configuration of the central processing unit 1000-2 is substantially the same as that of the central processing unit 1000-1 except that these execute the thread 2 and function as each member corresponding to the thread 2. Accordingly, description thereof will be omitted.

Figure 4:
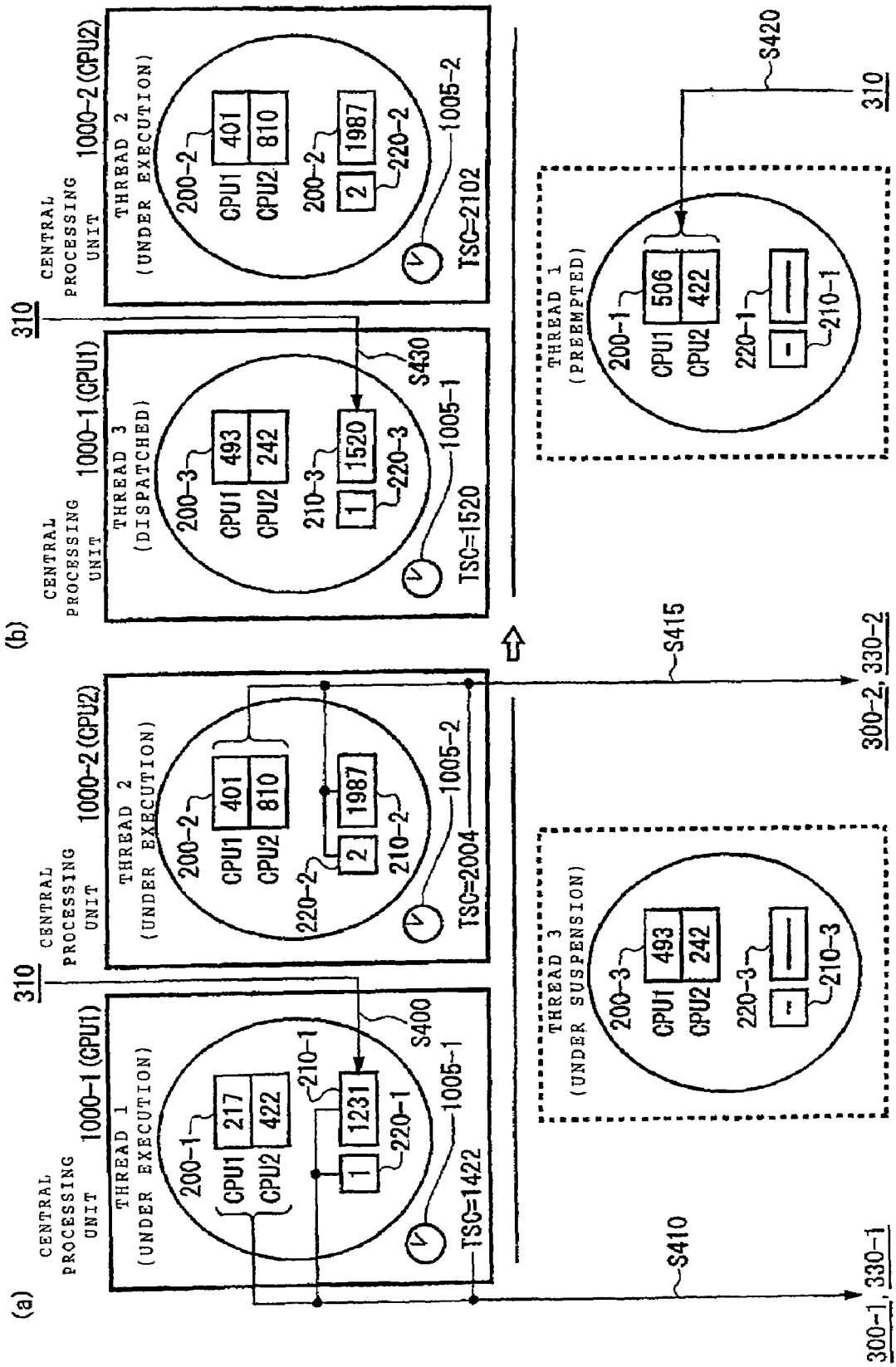
FIG. 4 is a view explaining an example of processing for updating the accumulated occurrence number of events or outputting the current accumulated occurrence number.

FIG. 4 is a view explaining an example of processing for updating the accumulated occurrence number of events or outputting the current accumulated occurrence number. FIG. 4(*a*) shows data in the RAM 1020, a counter value of the occurrence number counter 1005-1 and a counter value of the occurrence number counter 1005-2 in the case where the central processing unit 1000-1 is executing the thread 1 and the central processing unit 1000-2 is executing the thread 2.

When the central processing unit 1000-1 starts the execution of the thread 1, the accumulated number updating unit 310 acquires a counter value of the occurrence number counter 1005-1 at the start time, and stores the counter value in the start-time number storing unit 210-1 (S400). The stored counter value is assumed to be 1231. Moreover, the accumulated number updating unit 310 stores the information for identifying the central processing unit 1000-1 executing the thread 1 into the central processing unit identification information storing unit 220-1. The stored information is assumed to be 1.

Thereafter, events have occurred while the central processing unit 1000-1 was executing the thread 1, and the occurrence number counter 1005-1 holds 1422 as the counter value. In order to obtain the occurrence number of events at this point of time, the executing central processing unit determination unit 300-1 first determines the central processing unit executing the thread 1 (S410). For example, the executing central processing unit determination unit 300-1 determines that the thread 1 is executed by the central processing unit 1000-1 because 1 is stored in the central processing unit identification information storing unit 220-1.

Next, the accumulated number output unit 330-1 calculates the difference value obtained by subtracting the counter value stored in the start-time number storing unit 210-1 from the counter value of the occurrence number counter 1005-1. Specifically, for example, 191 is calculated by subtraction of 1231 from 1422. Then, the accumulated number output unit 330-1 adds the calculated difference value to the accumulated occurrence number stored in the accumulated number storing unit 200-1 correspondingly to the central processing unit executing the thread 1, and outputs a value obtained by the above-described addition to the outside.

Specifically, the central processing unit executing the thread 1 is the central processing unit 1000-1. Accordingly, the accumulated number output unit 330-1 adds 191 as the difference value to 217 corresponding to the central processing unit 1000-1, and outputs 408. Meanwhile, the central processing unit 1000-2 is not executing the thread 1. Accordingly, the accumulated number output unit 330-1 acquires the accumulated occurrence number (that is, 422) stored in the accumulated number storing unit 200-1 correspondingly to the central processing unit 1000-2, and outputs 422 as it is.

Moreover, in place of the above-described processing, in the case where the central processing unit 1000-1 starts the execution of the thread 1, the accumulated number updating unit 310 may calculate in advance a difference value obtained by subtracting a counter value stored in the central processing unit identification information storing unit 220-1 of the thread 1 from the accumulated occurrence number stored in the accumulated number storing unit 200-1 of the thread 1 correspondingly to the central processing unit 1000-1. For example, the accumulated number updating unit 310 stores in advance the calculated difference value as a value of the accumulated number storing unit 200-1, which corresponds to the central processing unit concerned. In this case, the start-time number storing unit 210-1 becomes unnecessary.

Moreover in this case, when it becomes necessary to calculate the accumulated occurrence number while the central processing unit 1000-1 is executing the thread 1, the counter value of the occurrence number counter 1005-1 is added to the difference value calculated in advance, and a value obtained by the addition is outputted. In such a way, processing by a thread of a user level can be reduced, and a turn-around time from the rise of the necessity to calculate the accumulated occurrence number to the output of the accumulated occurrence number can be shortened.

As in the processing in the thread 1, an executing central processing unit determination unit 300-2 determines a central processing unit executing the thread 2 (S415). For example, the executing central processing unit determination unit 300-2 determines that the thread 2 is being executed by the central processing unit 1000-2 because 2 is stored in the central processing unit identification information storing unit 220-2.

Next, an accumulated number output unit 330-2 calculates a difference value obtained by subtracting the counter value stored in the start-time number storing unit 210-2 from the counter value of the occurrence number counter 1005-2. Specifically, for example, 17 is calculated by subtraction of 1987 from 2004. Then, the accumulated number output unit 330-2 adds the calculated difference value to the accumulated occurrence number stored in the accumulated number storing unit 200-2 correspondingly to the central processing unit executing the thread 2, and outputs a value obtained by the above-described addition to the outside.

Specifically, the central processing unit executing the thread 2 is the central processing unit 1000-2. Accordingly, the accumulated number output unit 330-2 adds 17 as the difference value to 810 corresponding to the central processing unit 1000-2, and outputs 827. Meanwhile, the central processing unit 1000-1 is not executing the thread 2. Accordingly, the accumulated number output unit 330-2 acquires the accumulated occurrence number (that is, 401) stored in the accumulated number storing unit 200-2 correspondingly to the central processing unit 1000-1, and outputs 401 as it is.

FIG. 4(*b*) shows data in the RAM 1020, a counter value of the occurrence number counter 1005-1 and a counter value of the occurrence number counter 1005-2 in the case where the central processing unit 1000-1 terminates the execution of the thread 1 and resumes an execution of the thread 3, that is, in the case where the thread 1 is preempted and the thread 3 is dispatched. The counter value of the occurrence number counter 1005-1 at this point of time is 1520.

The central processing unit 1000-1 terminates the execution of the thread 1. Accordingly, the accumulated number updating unit 310 calculates a difference value obtained by subtracting the counter value stored in the start-time number storing unit 210-1 from a counter value of the occurrence number counter 1005-1 at the termination point of time (S420). As a result, 289 is calculated by subtraction of 1231 from 1520. Then, the accumulated number updating unit 310 adds the calculated difference value to the accumulated occurrence number stored in the accumulated number storing unit 200-1 in association with the central processing unit 1000-1. As a result, 506 is calculated by addition of 289 and 217.

Meanwhile, the central processing unit 1000-1 starts the execution of the thread 3. Accordingly, the accumulated number updating unit 310 acquires a counter value of the occurrence number counter 1005-1 at the start point of time, and stores the counter value in the start-time number storing unit 210-3 (S430). The counter value to be stored is 1520. Moreover, the accumulated number updating unit 310 stores information for identifying the central processing unit 1000-1 executing the thread 3 in the central processing unit identification information storing unit 220-3. The information to be stored is 1.

As described above, according to this embodiment, every time the thread is dispatched, the accumulated occurrence number of events having occurred until then is calculated, and stored in the storing area accessible in the user mode. Moreover, in the case where it becomes necessary to calculate the accumulated occurrence number, the value of the stored occurrence number is corrected by the occurrence number of events having occurred after the dispatch. In such a way, the accumulated occurrence number of events of the thread can be obtained appropriately in the user mode.

Note that, as a variation of this embodiment, the accumulated number storing unit may store, in association with each of the central processing units, the occurrence number of events per number of clock cycles, which have occurred while the thread 1 corresponding thereto was being executed by the central processing unit concerned. As an example, the accumulated number storing unit may store the number of cache misses per number of clock cycles, that is, a cache miss frequency.

In this case, when the central processing unit terminates the execution of the thread, first, the accumulated number updating unit calculates a difference value obtained by subtracting a counter value stored in the start-time number storing unit of the same thread from a counter value of the occurrence number counter of the central processing unit concerned. Then, the accumulated number updating unit adds a value obtained by dividing the difference value by a value based on an operating frequency of the same central processing unit to the accumulated occurrence number stored in the accumulated number storing unit of the same thread correspondingly to the same central processing unit. In such a way, also in a central processing unit capable of changing the operating frequency, an influence of variations of the operating frequency can be excluded, and the occurrence number of events can be obtained.

Subsequently, regarding so-called M:N threading, a method for obtaining the occurrence number of events having occurred while each of user threads was being executed is shown as a modified example of this embodiment. Here, the M:N threading is referred to as a scheduling method for scheduling, by N pieces of threads (hereinafter, referred to as scheduling threads) provided by kernels of an operating system, other M pieces of threads (hereinafter, referred to as user threads).

In this modified example, description will be made for performing a user level scheduling in such a manner that each scheduling thread executes any of the plural user threads, in which each of the threads described in FIGS. 1 to 4 is defined as the scheduling thread. In the description below, the number of scheduling threads is assumed to be two, and the number of user threads is assumed to be three.

Figure 5:
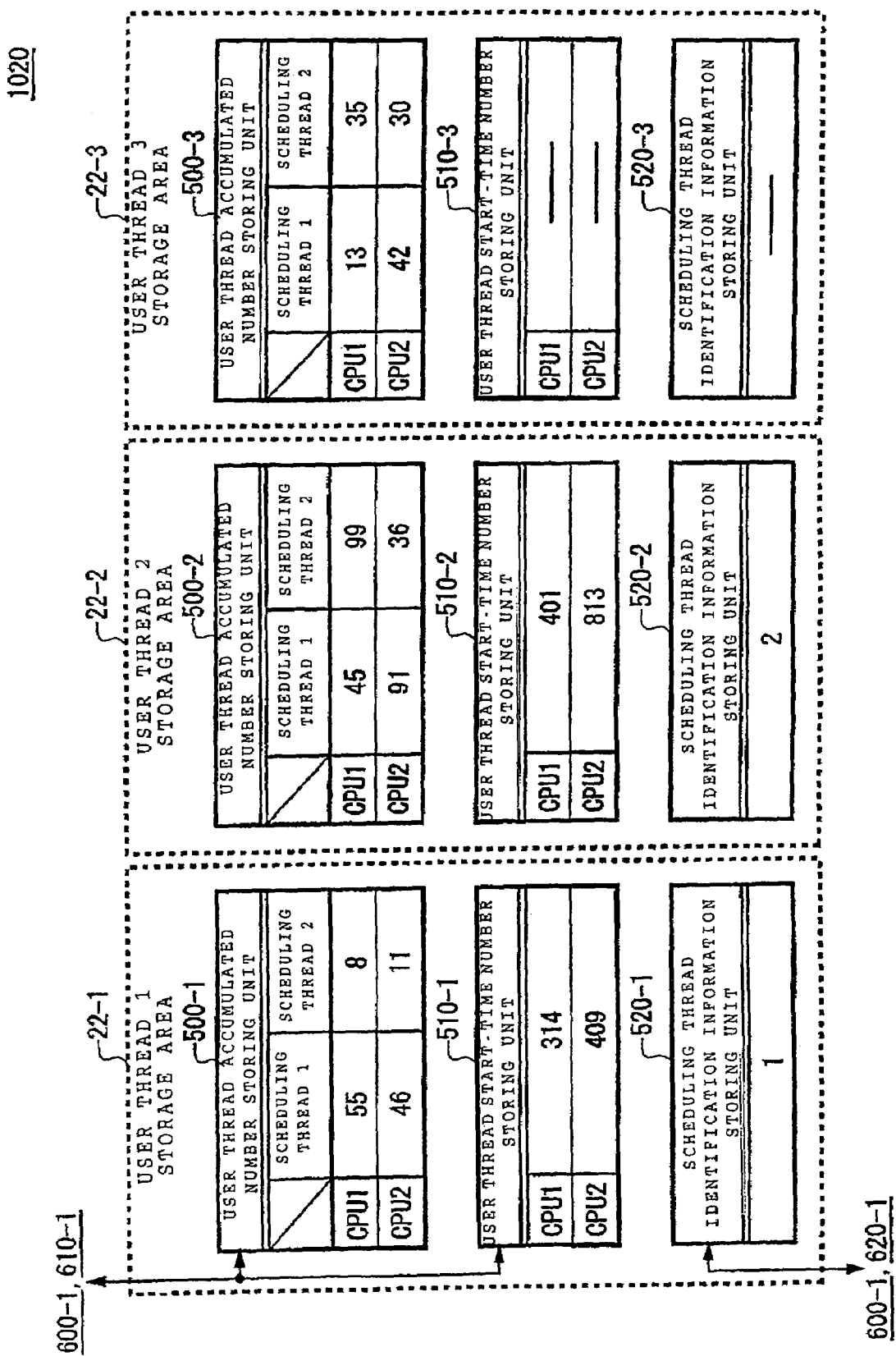
FIG. 5 shows an example of a data structure of the RAM 1020 in a modified example of this embodiment.

FIG. 5 shows an example of a data structure of the RAM 1020 in the modified example of this embodiment. In this modified example, in addition to the configuration shown in FIG. 2, the RAM 1020 further includes a user thread storage area 22-1, a user thread storage area 22-2, and a user thread storage area 22-3. The user thread storage area 22-1 is an area provided correspondingly to a user thread 1 and accessible by the user thread 1 in a user mode. The user thread storage area 22-2 is an area provided correspondingly to a user thread 2 and accessible by the user thread 2 in a user mode. The user thread storage area 22-3 is an area provided correspondingly to a user thread 3 and accessible by the user thread 3 in a user mode.

In the user thread storage area 22-1, a user thread accumulated number storing unit 500-1, a user thread start-time number storing unit 510-1, and a scheduling thread identification information storing unit 520-1 are provided. The user thread accumulated number storing unit 500-1 is provided in the user thread storage area 22-1 correspondingly to the user thread 1, and stores, in association with each of the central processing units and each of the scheduling threads, the accumulated occurrence number of events having occurred while the user thread 1 was being executed by the central processing unit concerned and the scheduling thread concerned.

The user thread start-time number storing unit 510-1 is provided in the thread storage area of the user thread 1 correspondingly to the user thread 1. The user thread start-time number storing unit 510-1 stores the accumulated occurrence number outputted by the accumulated number output unit for the scheduling thread executing the user thread 1 at the point of time when the scheduling thread executing the user thread 1 starts the execution of the user thread 1. The scheduling thread identification information storing unit 520-1 stores identification information for identifying the scheduling thread executing the user thread 1, while the user thread 1 is being executed.

In the user thread storage area 22-2, a user thread accumulated number storing unit 500-2, a user thread start-time number storing unit 510-2, and a scheduling thread identification information storing unit 520-2 are provided. The user thread accumulated number storing unit 500-2, the user thread start-time number storing unit 510-2, and the scheduling thread identification information storing unit 520-2 are substantially the same as the user thread accumulated number storing unit 500-1, the user thread start-time number storing unit 510-1, and the scheduling thread identification information storing unit 520-1, respectively, except that these are associated with the user thread 2 instead of the user thread 1. Accordingly, description thereof will be omitted.

Moreover, in the user thread storage area 22-3, a user thread accumulated number storing unit 500-3, a user thread start-time number storing unit 510-3, and a scheduling thread identification information storing unit 520-3 are provided. The user thread accumulated number storing unit 500-3, the user thread start-time number storing unit 510-3, and the scheduling thread identification information storing unit 520-3 are substantially the same as the user thread accumulated number storing unit 500-1, the user thread start-time number storing unit 510-1, and the scheduling thread identification information storing unit 520-1, respectively, except that these are associated with the user thread 3 instead of the user thread 1. Accordingly, description thereof will be omitted.

Figure 6:
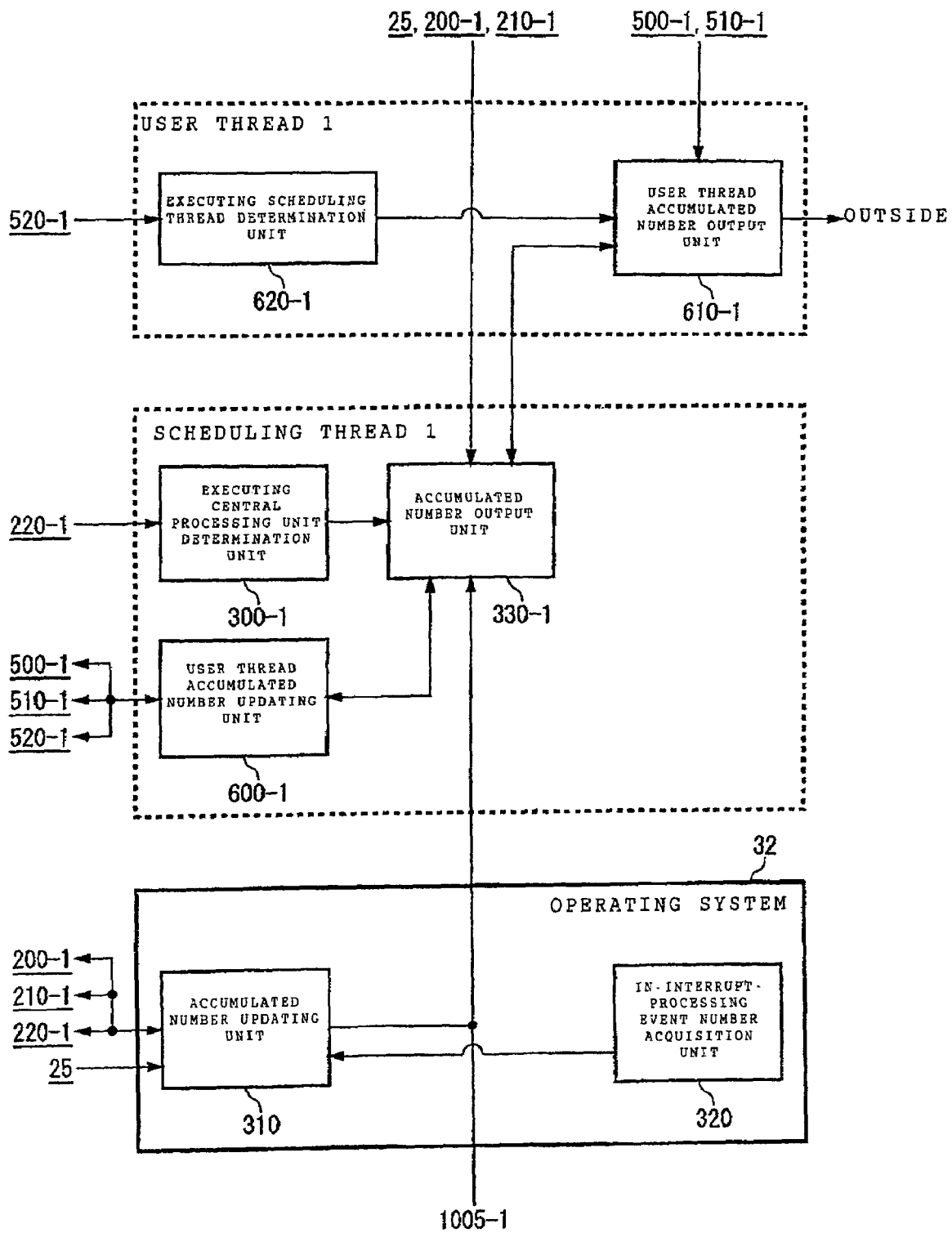
FIG. 6 shows functions of programs executed by the central processing unit 1000-1 while dividing the functions into functional blocks in the modified example of this embodiment.

FIG. 6 shows functions of programs executed by the central processing unit 1000-1 while dividing the functions into functional blocks, in a modified example of this embodiment. In this modified example, the central processing unit 1000-1 executes the operating system 32 and executes the scheduling thread 1 in a similar way as shown in FIG. 3. The central processing unit 1000-1 further executes the user thread 1 by means of the scheduling thread 1.

The scheduling thread 1 further includes a user thread accumulated number updating unit 600-1 in addition to the executing central processing unit determination unit 300-1 and the accumulated number output unit 330-1. When the scheduling thread 1 starts the execution of the user thread 1, the user thread accumulated number updating unit 600-1 acquires the accumulated occurrence number for each of the central processing units from the accumulated number output unit 330-1 of the scheduling thread 1, and stores the accumulated occurrence number in the user thread start-time number storing unit 510-1. Moreover, the user thread accumulated number updating unit 600-1 stores the information for identifying the scheduling thread 1 executing the user thread 1 in the scheduling thread identification information storing unit 520-1.

In the case where the scheduling thread 1 terminates the execution of the user thread 1, the user thread accumulated number updating unit 600-1 requests the accumulated number output unit 330-1 to calculate the accumulated occurrence number for each of the central processing units regarding the scheduling thread. Then, the user thread accumulated number updating unit 600-1 calculates, for each of the central processing units, a difference value by subtracting the accumulated occurrence number stored correspondingly to the central processing unit 1000-1 executing the scheduling thread 1 in the user thread start-time number storing unit 510-1 from the accumulated occurrence number calculated for each of the central processing units. Moreover, the user thread accumulated number updating unit 600-1 adds the calculated difference value to the accumulated occurrence number stored in the user thread accumulated number storing unit 500-1 of the user thread 1 in association with the scheduling thread 1.

An executing scheduling thread determination unit 620-1 determines the scheduling thread executing the user thread 1 based on the identification information acquired from the scheduling thread identification information storing unit 520-1. A user thread accumulated number output unit 610-1 is provided correspondingly to the user thread 1. The user thread accumulated number output unit 610-1 requests the accumulated number output unit 330-1 to calculate and output the accumulated occurrence number regarding the scheduling thread executing the user thread 1.

Then, the user thread accumulated number output unit 610-1 calculates, for each of the central processing units, a difference value by subtracting, from the outputted accumulated occurrence number, the accumulated occurrence number stored in the user thread start-time number storing unit 510-1 of the user thread 1 correspondingly to the scheduling thread 1. Moreover, the user thread accumulated number output unit 610-1 adds the calculated difference value for each of the central processing units to the accumulated occurrence number stored in the user thread accumulated number storing unit 500-1 of the user thread 1 correspondingly to the scheduling thread 1, and outputs a value obtained by the addition.

Note that a configuration of the central processing unit 1000-2 is substantially the same as that of the central processing unit 1000-1 except that these execute the thread 2 and function as each member corresponding to the thread 2. Accordingly, description thereof will be omitted.

Figure 7:
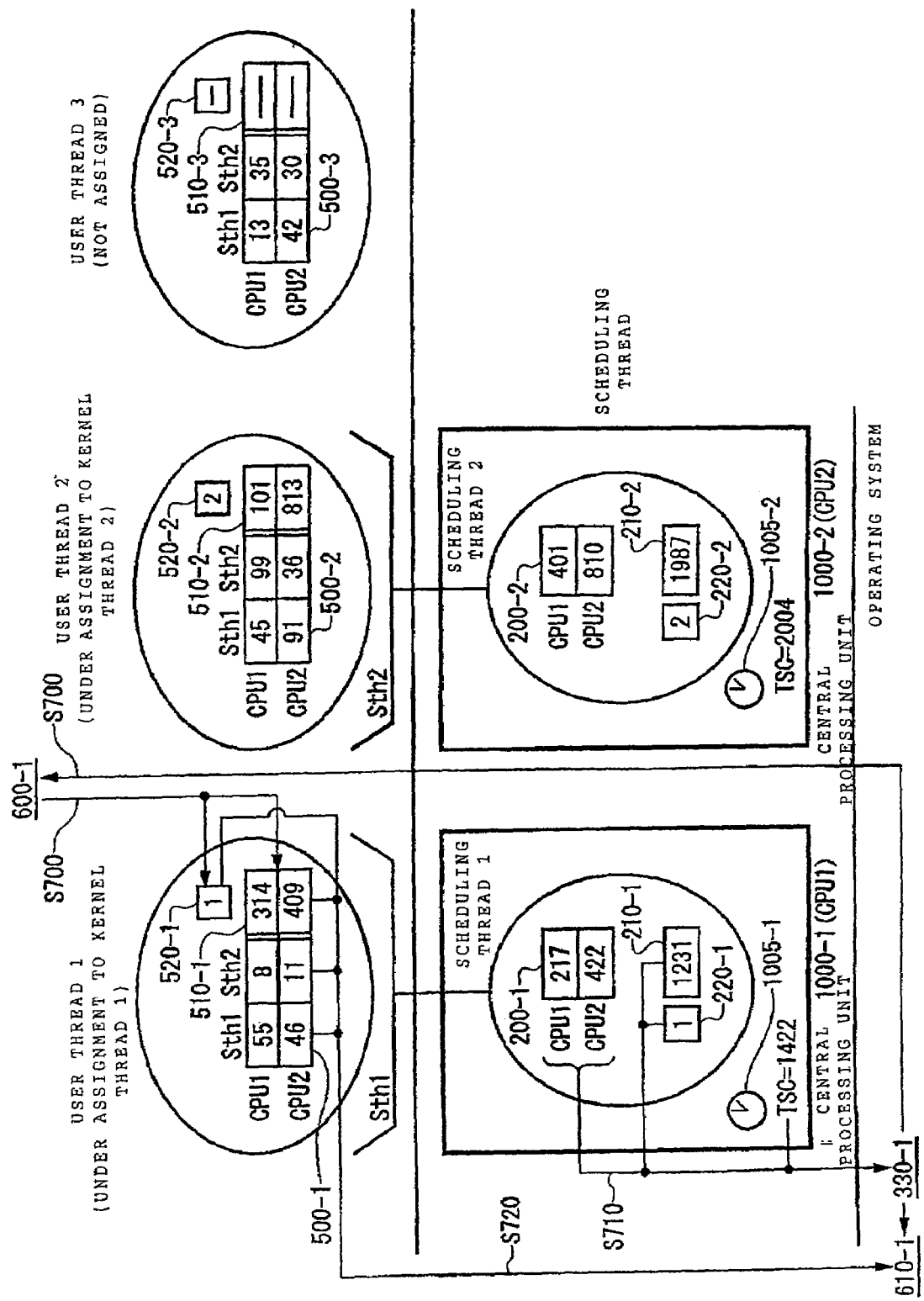
FIG. 7 is a view explaining an example of processing for outputting the current accumulated occurrence number in the modified example of this embodiment.

FIG. 7 is a view explaining an example of processing for outputting the current accumulated occurrence number in the modified example of this embodiment. When the scheduling thread 1 starts the execution of the user thread 1, the user thread accumulated number updating unit 600-1 acquires the accumulated occurrence number for each of the central processing units from the accumulated number output unit 330-1 of the scheduling thread 1, and stores the accumulated occurrence number in the user thread start-time number storing unit 510-1 (S700). Moreover, the user thread accumulated number updating unit 600-1 stores the information for identifying the scheduling thread 1 executing the user thread 1 in the scheduling thread identification information storing unit 520-1.

In order to calculate the accumulated occurrence number regarding the user thread 1 while the user thread 1 is being executed, the user thread accumulated number output unit 610-1 performs the following processing. First, the user thread accumulated number output unit 610-1 requests the accumulated number output unit 330-1 to calculate and output the accumulated occurrence number regarding the scheduling thread 1 executing the user thread 1 (S710). As a result, a calculation of 1422−1231+217 is performed in association with the central processing unit 1000-1, and 408 is calculated. Meanwhile, 422 is read out from the accumulated number storing unit 200-1, and this value is outputted as it is.

Then, the user thread accumulated number output unit 610-1 calculates, for each of the central processing units, a difference value by subtracting, from the accumulated occurrence number thus outputted, the accumulated occurrence number stored in the user thread start-time number storing unit 510-1 of the user thread 1 correspondingly to the user thread 1 (S720). Specifically, regarding the central processing unit 1000-1, a calculation of 408−314 is performed, and 94 is calculated. Meanwhile, regarding the central processing unit 1000-2, a calculation of 422−409 is performed, and 13 is calculated.

Then, the user thread accumulated number output unit 610-1 adds the difference value calculated for each of the central processing units to the accumulated number stored in the user thread accumulated number storing unit 500-1 in association with the scheduling thread 1, and outputs a value obtained by the addition. Specifically, regarding the central processing unit 1000-1, a calculation of 94+55 is performed, and 149 is calculated. Meanwhile, regarding the central processing unit 1000-2, a calculation of 13+46 is performed, and 59 is calculated.

Meanwhile, the scheduling thread 2 is not executing the user thread 1. Accordingly, the user thread accumulated number output unit 610-1 reads out the occurrence number corresponding to the scheduling thread 2 and the central processing unit 1000-1 from the user thread accumulated number storing unit 500-1, and outputs the occurrence number as it is (specifically, outputs 8). Likewise, the user thread accumulated number output unit 610-1 reads out the occurrence number corresponding to the scheduling thread 2 and the central processing unit 1000-2 from the user thread accumulated number storing unit 500-1, and outputs the occurrence number as it is (specifically, outputs 11).

As shown in this drawing, in the system adopting the M:N threading, not only for the scheduling threads but also for the user threads, the occurrence number of events for each of the central processing units and each of the scheduling threads can be obtained accurately.

As shown in this embodiment and this modified example, the operating system or each scheduling thread writes the information necessary to calculate the occurrence number of events to the area accessible in the user mode when the thread is dispatched. As a result, the user level thread can calculate the occurrence number of events accurately without calling the function of the operating system.

Thus, a necessity to use a system call of which latency is high is eliminated, and accordingly, the occurrence number of events can be obtained rapidly. As a result, even if the occurrence number of events is obtained in a wide region where the program is executed, an overhead is small. Accordingly, the behavior of the program can be analyzed effectively and efficiently. As an example, this embodiment and this modified example are extremely effective in behavior analysis and performance improvement of a large-scale program, such as a Web application, where there is no hot spot.

Moreover, according to this embodiment and this modified example, the occurrence number of events can be obtained not only for each of the threads but also for each of the central processing units. Thus, even if the clock cycles of the central processing units are asynchronous with each other and the performances of the central processing units differ from each other, for example, even if access speeds to the memory differ from each other depending on the central processing units, each of the central processing units can add up the occurrence number independently of the other, and useful data can be obtained.

As above, the present invention has been described by use of the embodiment. However, the technical scope of the present invention is not limited to the scope described in the above-described embodiment. It is obvious for those skilled in the art that various alterations or modifications can be added to the above-described embodiment. For example, though the number of clock cycles and the like of each thread for each of the central processing units have been obtained in this embodiment, these may be further broken down, and may be obtained by performing classification thereof into processing in the user level and processing in the kernel level. It is obvious from the description of the scope of claims that an aspect added with such alterations or modifications can also be incorporated in the technical scope of the present invention.

According to the present invention, in a system including a plurality of central processing units, the occurrence number of events, which have occurred while each of the central processing units is executing each of the threads, can be calculated faster than before for the thread and for the central processing unit.

Although the preferred embodiment of the present invention has been described in detail, it should be understood that various changes, substitutions and alternations can be made therein without departing from spirit and scope of the inventions as defined by the appended claims.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An information processing apparatus for storing a number of events, which have occurred in each central processing unit of a plurality of central processing units which is executing a thread, into a thread storage area where the thread thus executed is accessible in a user mode, comprising:
    an occurrence number counter, which is provided correspondingly to each of the plurality of central processing units, and which counts a number of events which have occurred in each corresponding central processing unit;
    an accumulated number storing unit provided in a thread storage area for each thread, which stores an accumulated occurrence number of events having occurred while the thread was being executed by the corresponding central processing unit, the accumulated occurrence number having been counted until the corresponding central processing unit terminated an execution of the thread at the last time, while associating the accumulated occurrence number with each of the central processing units;
    a start-time number storing unit, which is provided in the thread storage area for each thread, and which stores a counter value of the occurrence number counter of the corresponding central processing unit, the counter value having been counted until the thread is resumed by the corresponding central processing unit which has been executing the thread;
    an accumulated number updating unit for adding, to the accumulated occurrence number which has been stored in the accumulated number storing unit corresponding to the corresponding central processing unit, a difference value obtained by subtracting a counter value which has been stored in the start-time number storing unit of the thread, from a counter value of the occurrence number counter of the corresponding central processing unit, in response to the corresponding central processing unit's termination of the execution of the thread;
    an executing central processing unit determination unit for determining the corresponding central processing unit executing the thread being executed;
    an accumulated number output unit for adding a difference value to the accumulated occurrence number stored in the accumulated number storing unit of each of the threads correspondingly to the corresponding central processing unit and for outputting a value obtained by the addition, the accumulated number output unit being provided correspondingly to each thread, and the difference value to be added being obtained by subtracting the counter value stored in the start-time number storing unit of the thread from the counter value of the occurrence number counter of the central processing unit executing the thread;
    a central processing unit identification information storing unit for storing central processing unit identification information for identifying the corresponding central processing unit executing each of the threads, the central processing unit identification information storing unit being provided in the thread storage area of the thread correspondingly to the thread, wherein the executing central processing unit determination unit determines the corresponding central processing unit executing the thread based on the central processing unit identification information stored in the central processing unit identification information storing unit;

wherein, in a case where any of the central processing units starts an execution of a thread, the accumulated number updating unit calculates in advance a difference value by subtracting the counter value stored in the start-time number storing unit of the thread from the accumulated occurrence number stored in the accumulated number storing unit of the thread correspondingly to said any central processing unit, and while the corresponding central processing unit is executing the thread, the accumulated number output unit adds the counter value of the occurrence number counter of the corresponding central processing unit to the difference value calculated in advance, and outputs a value obtained by the addition wherein each of the threads is a scheduling thread for performing a user level scheduling by executing any of a plurality of user threads, and the information processing apparatus further comprises:

a user thread accumulated number storing unit for storing the accumulated occurrence number of events having occurred while the user thread was being executed by the corresponding central processing unit and the scheduling thread in association with each of the central processing units and each of the scheduling threads, the user thread accumulated number storing unit being provided correspondingly to each of the user threads in the thread storage area;

a user thread start-time number storing unit for storing the accumulated occurrence number outputted by the accumulated number output unit regarding the scheduling thread executing the user thread at a point of time when the scheduling thread starts the execution of the user thread, the user thread start-time number storing unit being provided in the thread storage area correspondingly to each of the user threads;

a user thread accumulated number updating unit for calculating, in a case where the scheduling thread terminates the execution of the user thread, a difference value obtained by subtracting the accumulated occurrence number for each of the central processing units having been stored in the user thread start-time number storing unit of the user thread correspondingly to the scheduling thread, from the accumulated occurrence number outputted by the accumulated number output unit regarding the scheduling thread, and for adding the difference value to the accumulated occurrence number stored in the user thread accumulated number storing unit of the user thread in association with the scheduling thread;

an executing scheduling thread determination unit for determining the scheduling thread executing the user thread with respect to the user thread being executed;

a user thread accumulated number output unit for calculating a difference value for each of the central processing units, the difference value obtained by subtracting the accumulated occurrence number stored in the user thread start-time number storing unit of each of the user threads correspondingly to the scheduling thread from the accumulated occurrence number outputted by the accumulated number output unit regarding the scheduling thread executing the user thread, for adding the difference value to the accumulated occurrence number stored in the user thread accumulated number storing unit of the user thread in association with the scheduling thread, and for outputting a value obtained by the addition, the user thread accumulated number output unit being provided correspondingly to each of the threads;

an execution start-time expected occurrence number storing unit for storing a predetermined expected occurrence number of events expected to occur during a period from a termination of an execution of a user program by a central processing unit to a start of an execution of another user program by the central processing unit, wherein the accumulated number updating unit further subtracts the expected occurrence number from the accumulated occurrence number to which the difference value is added, and outputs a value obtained by the subtraction;

an in-interrupt-processing event number acquisition unit for acquiring an occurrence number of events having occurred while interrupt processing for the thread was being processed, wherein the accumulated number updating unit further subtracts the occurrence number acquired by the in-interrupt-processing event number acquisition unit from the accumulated occurrence number to which the difference value is added;

and having further capability of:

(a) when the occurrence number counter is provided correspondingly to each of the plurality of central processing units, and counts the occurrence number of cache misses having occurred in the central processing unit, the accumulated number storing unit is provided in the thread storage area of the thread correspondingly to each of the threads, and stores the accumulated occurrence number of cache misses having occurred while the thread was being executed by the central processing unit in association with each of the central processing units, and the accumulated number updating unit adds a difference value to the accumulated occurrence number of cache misses stored in the accumulated number storing unit of the thread correspondingly to the central processing unit, the difference value being obtained by subtracting a counter value stored in the start-time number storing unit of the thread from a counter value of the occurrence number counter of the central processing unit executing the thread;

(b) when the occurrence number counter is provided correspondingly to each of the plurality of central processing units, and counts the number of instructions executed by the central processing unit, the accumulated number storing unit is provided correspondingly to each of the threads in the thread storage area of the thread, and stores the accumulated number of instructions executed by the central processing unit while the thread was being executed by the central processing unit in association with each of the central processing units, and the accumulated number updating unit adds a difference value to the accumulated number of instructions stored in the accumulated number storing unit of the thread correspondingly to the central processing unit, the difference value being obtained by subtracting a counter value stored in the start-time number storing unit of the thread from a counter value of the occurrence number counter of the central processing unit executing the thread;

(c) when the occurrence number counter is provided correspondingly to each of the plurality of central processing units, and counts the occurrence number of branch prediction misses having occurred in the central processing unit, the accumulated number storing unit is provided correspondingly to each of the threads in the thread storage area of the thread, and stores the accumulated occurrence number of branch prediction misses having occurred while the thread was being executed by the central processing unit in association with each of the central processing units, and the accumulated number updating unit adds a difference value to the accumulated occurrence number of branch prediction misses stored in the accumulated number storing unit of the thread correspondingly to the central processing unit, the difference value being obtained by subtracting a counter value stored in the start-time number storing unit of the thread from a counter value of the occurrence number counter of the central processing unit executing the thread; and (d) when the occurrence number counter is provided correspondingly to each of the plurality of central processing units, and counts the accumulated number of execution cycles performed by the central processing unit, the accumulated number storing unit is provided correspondingly to each of the threads in the thread storage area of the thread, and stores the accumulated number of execution cycles performed by the central processing unit while the thread was being executed by the central processing unit in association with each of the central processing units, and the accumulated number updating unit adds a difference value to the accumulated number of execution cycles stored in the accumulated number storing unit of the thread correspondingly to the central processing unit, the difference value being obtained by subtracting a counter value stored in the start-time number storing unit of the thread from a counter value of the occurrence number counter of the central processing unit executing the thread; and wherein the accumulated number storing unit stores the occurrence number of events per clock cycle in association with each of the central processing units, the events having occurred while the thread corresponding thereto was being executed by the central processing unit concerned, and in a case where the central processing unit terminates the execution of the thread, the accumulated number updating unit adds a value to the accumulated occurrence number stored in the accumulated number storing unit correspondingly to the central processing unit, the value being obtained by dividing a difference value by a value based on an operating frequency of the central processing unit, the difference value being obtained by subtracting a counter value stored in the start-time number storing unit of the thread from a counter value of the occurrence number counter of the central processing unit.

\* \* \* \* \*